UNITED STATES PATENT OFFICE 2,504,847

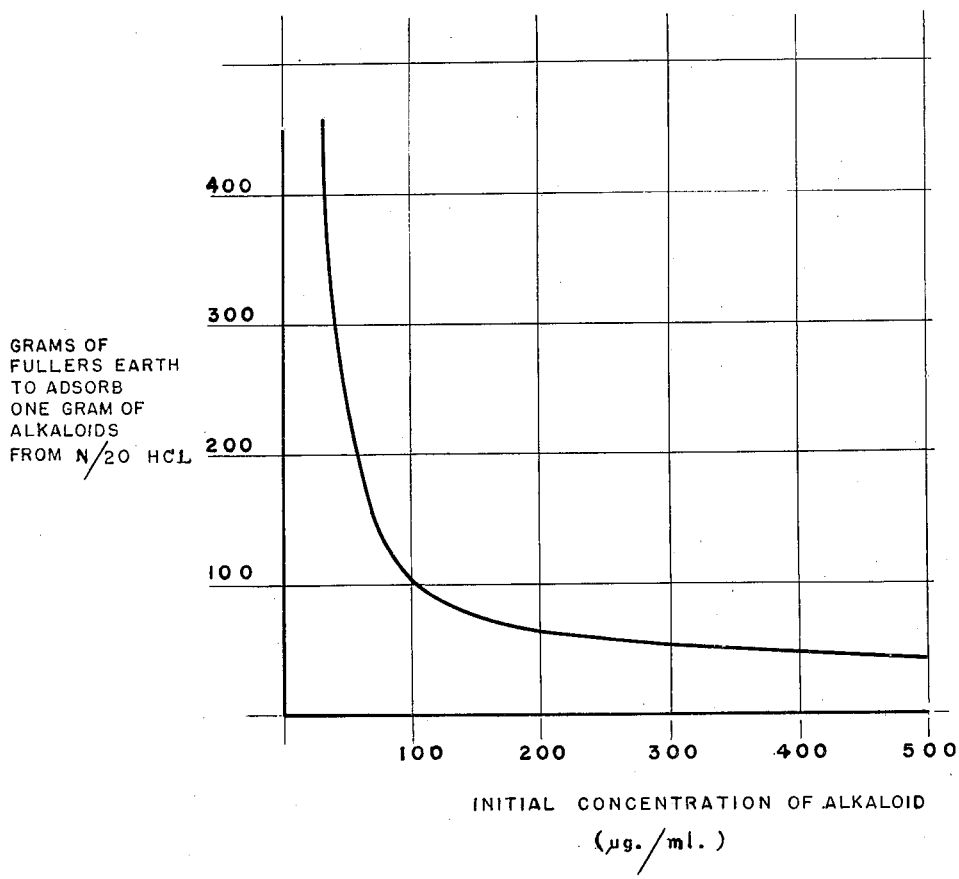

PROCESS FOR OBTAINING FEBRIFUGINE ALKALOIDS

Joseph B. Koepfli, San Marino, and James F. Mead and John A. Brockman, Jr., Pasadena, Calif., assignors to United States of America as represented by the Secretary of the Army Application May 11, 1948, Serial No. 26,428

3 Claims. (Cl. 260—236)

In view of the prevalence of malarial fevers in various portions of the world, and the possibility of interruption or complete severance of the supplies of natural quinine, considerable research and intensive efforts have been made to synthesize compounds which will have a positively curative action on the disease by being lethal to the malarial parasites, rather than a merely suppressive action, as is the case of many of the antimalarial drugs, including quinine, atabrine, and the like.

It has been known for many years that certain preparations have been in used in Asiatic countries, such as in various provinces of China, which possess marked antimalarial properties, these preparations including that given the proprietary name of "Chunine," and also a drug known as "Ch'ang Shan" which is a generic name used in different parts of China to describe different drugs.

These drugs having antimalarial properties are of vegetable origin, and it has appeared probable that the "Ch'ang Shan" used in Szechuan province of China, and particularly the variety called "chicken bone," or "yellow Ch'ang Shan," is the root material of the shrub *Dichroa febrifuga*, which shrub belongs to the family Saxifragaceae. Additionally, there is evidence that both the leaves and roots of *Dichroa febrifuga*, were used in Indo-China for the treatment of intermittent fevers.

In view of these observations, it may be stated that the principal object of this invention is to isolate the antimalarial substances which impart antimalarial properties to *Dichroa febrifuga*, and to identify these substances.

Further objects of the invention will become apparent as the description proceeds, and the features of novelty will be pointed out in particularity in the appended claims.

Before proceeding with the description of the process of the present invention, it may be pointed out that, in carrying out the process of the present invention, two alkaloids, febrifugine and isofebrifugine, have been isolated from the leaves and roots of botanically identified *D. febrifuga* obtained in India from the root material called "Ch'ang Shan" from Chungking, China, and from the proprietary drug "Chunine" obtained from Kunming, China. With the availability of adequate amounts of "Ch'ang Shan," or the root material from *D. febrifuga*, it finally has been possible to obtain highly potent fractions with activities as high as 40 times that of quinine when tested in avian malaria; and when eventually the two alkaloids, febrifugine and isofebrifugine, were isolated from the extracts of the root material, the former was found to be approximately 100 times as active as quinine and the latter alkaloid is approximately as active as quinine in avian malaria. In addition to these considerations, the invention includes an efficient method of extraction and isolation of these alkaloids.

Generally considered, the method of the present invention includes extracting the ground plant material with dilute acid, adsorbing the alkaloids on a suitable adsorbent medium, such as fuller's earth, removing them from the fuller's earth with butanol under alkaline conditions, concentrating them by distribution between immiscible solvents, and finally evaporating the resulting solution to dryness. In connection with the process it may be pointed out that these alkaloids are altered by mild heating. Consequently, it is important that all operations be carried out at room temperature or lower, particularly when the medium is basic. Furthermore, there may be alteration, with time, in solutions of the alkaloids, so that prolonged standing in solution should be avoided.

The process of the invention may be carried out as follows:

*Extraction of the roots.*—It has been found satisfactory to grind the roots to 8 to 10 mesh. The ground roots are extracted with 0.1 N hydrochloric acid by soaking the roots for forty-eight hours or longer, draining or pressing out the solution, and repeating the process until the roots are exhausted.

The progress of the extraction by filtering off the acid extract can be followed by testing the filtrate with Dragendorff's reagent. If the filtrate is not clear, it should be refiltered before applying the tests. In 0.1 N HCl, three drops of Dragendorff's reagent added to 1 ml. of solution will give an immediate cloudiness with 12 $\mu$g. of alkaloid, a barely perceptible cloudiness in one-half to one minute with 6 $\mu$g., and a clear solution with 3 $\mu$g. (If allowed to stand several minutes a precipitate may form.) An approximate value of the concentration of alkaloid in a solution can be obtained by serially diluting (factor of 2) of a sample until no test is obtained in one-half to one minute, assuming the concentration to be 5 $\mu$g. per ml., and multiplying by a dilution factor. The plant extract may give a pronounced deeping in color with Dragendorff's reagent, but this should not be confused with the cloudiness, which is the alkaloid test.

The critical point in this extraction is that, when it is complete, the concentration of the alkaloid in the extract should be above about 75–100 μg. per ml. A rough estimate of the amount of alkaloid present in the roots can be obtained by considering the Q value (quinine coefficient determined with *P. lophurae* in ducks, the procedure for which determination is found in "Survey of Anti-malarial Drugs, 1941–1945" by F. Y. Wiselogle, Editor, Edwards Brothers, Ann Arbor, Michigan, 1946, vol. I, page 62, and test 1-2, page 486) to be the percent by weight of alkaloid. Thus, if Q=0.1, 1 kg. of roots contains 1 μg. of alkaloid, the total volume of HC 1 used in the extraction should not exceed ten liters. A smaller amount is desirable, say five to seven liters.

The Dragendorff reagent, referred to above, is a well-known reagent for alkaloids. It is prepared by dissolving 8 grams of bismuth subnitrate in 20 cc. of nitric acid (density 1.18) and adding gradually to a concentrated aqueous solution of 22.7 grams of potassium iodide. The solution is cooled, decanted from the potassium nitrate crystals, and diluted to 100 cc. with water.

*Adsorption of the alkaloid.*—The alkaloid in the extract produced as above is concentrated for removal from the extract conveniently by adsorption on a suitable adsorbent. In practice, a cheaply available adsorbent is found in fuller's earth.

In this connection, attention is called to the accompanying drawing which is a graph showing the amount of fuller's earth necessary for adsorption of illustrative amounts of alkaloid.

When the extraction of the alkaloid is complete, as carried out as described above, the combined extracts are filtered through fuller's earth, and then the alkaloid concentration and the total weight of alkaloid are determined by the serial dilution method described above, using Dragendorff's reagent. Thus, suppose, for example, that ten liters of solution were obtained, and, when 1 ml. is serially diluted, a precipitate is obtained with Dragendorff's reagent at dilutions of 2, 4, 8 and 16, but not at 32. The concentration of alkaloid is then about 32×5=160 μg./ml. and the total weight of alkaloid then is about 160×10,000=1,600,000 μg., or 1.69.

Next, by use of the graph of the drawing, the amount of fuller's earth necessary for the adsorption is ascertained. For 1 g. of alkaloid at a concentration of 160 μg./ml., about 75 g. of fuller's earth is needed, so that for 1.6 g., 120 g. are needed, and 180 g. (50% excess) should be used to allow for errors in the determinations involved. The fuller's earth is added to the clear extract prepared as described above, and then enough 12 N HCl to make the mixture strongly acid to Congo red. The equivalent weight of fuller's earth (reacting as a base) is 100 to 150, so that the amount of acid needed can be calculated roughly. A little excess HCl does no harm. The mixture is stirred several turns and the pH is checked occasionally with Congo red paper, with further additions of more hydrochloric acid if necessary.

The adsoprtion takes place rapidly. The purpose of long stirring is two-fold: (1) to assure good contact between the relatively small amount of adsorbent and large amount of liquid, and (2) to leach out the acid-soluble compounds in the fuller's earth. At the beginning of the last hour of stirring, enough fuller's earth is added to equal one-third of the weight of the total fuller's earth taken. When the stirring is complete, the mixture is filtered through a pad of fuller's earth weighing about one-sixth the amount of fuller's earth taken. The filtrate now should contain only from about one percent to about five percent of the original amount of alkaloids, and, if the serial dilution test with Dragendorff's reagent indicates this to be so, it may be discarded.

*Elution with butanol.*—The filter cake is mixed with enough water to make a thin paste. Too much water may lead to undesirable fuller's earth-butanol emulsions later; too little water may make the extraction unduly slow. An amount of water approximately equal in weight to the fuller's earth has been found to be satisfactory. About 6 g. of sodium carbonate per 100 ml. water are added. This should make the mixture decidedly basic. If the pH is not greater than 8.5, more sodium carbonate must be added.

An amount of butanol is added equal to three times the amount of water added. Stir or shake thoroughly for one to three hours. Two hours of mechanical shaking usually are sufficient. Allow the resulting mixture to stand. If the proper proportions of solid, water and butanol were attained, the mixture will separate into a top butanol phase and a bottom solid-aqueous phase. The butanol layer is siphoned off, and if the volume of butanol is nearly the same as that originally added, a second extraction of the solid-aqueous phase is carried out, using one-third the amount of butanol. If the volume of butanol is significantly less than that originally added, or if a solid-butanol emulsion is formed, the mixture is filtered, the liquid phases separated, by centrifuging if necessary, the aqueous phase returned to the solid, and the mixture extracted again with one-third of the volume of butanol.

If the volume of the butanol recovered in these two extractions is essentially the same as the volume of butanol added, these two extractions probably are adequate. If the volume recovered is appreciably less than the original, additional extractions with butanol should be made to assure recovering all alkaloids.

*Concentration by distribution between immiscible solvents.*—The combined butanol extracts obtained as above now contain the alkaloids. Add to the butanol one-half of its volume of ligroin (B. P. 60°–70° C.) and one-half percent of 6 N HCl; that is, to one liter of butanol extract, add 500 ml. of ligroin and 5 ml. of 6 N HCl. Shake, allow to stand, separate off the aqueous phase, and extract the organic layer three more times with 0.1 N HCl, using portions equal to substantially eight percent of the original butanol volume; that is, 80 ml. of 0.1 N HCl per liter of butanol, or 1.5 per liter of butanol-ligroin mixture. No emulsions have been observed at this stage.

The alkaloids are now in the aqueous hydrochloric acid extracts. Add enough sodium carbonate to neutralize the acid and to give sufficient excess to make the solution about one-twentieth molar with respect to sodium carbonate. Extract three times with 20 volume percent butanol in chloroform, using portions equal to one-third the volume of the aqueous phase. Easily broken emulsions may be encountered in this step.

The alkaloids now are in the butanol-chloroform layer. Extract with N/4 HCl four times using portions equal to five percent of the volume butanol-chloroform, or three times using eight percent portions. That is, one liter of butanol-chloroform would be extracted with four 50 ml. portions of N/4 HCl or with three 80 ml. portions of acid.

The alkaloids now are in the acid extract. Make basic with sodium carbonate, having enough excess to make the solution about 1/20 molar with respect to sodium carbonate. Extract three times with 20 volume percent butanol in chloroform, using portions equal to one-third the volume of the aqueous phase.

The alkaloids now are in the butanol-chloroform phase. Evaporate this to a paste at reduced pressure and at room temperature.

To the pasty mixture of crude bases there is added a sufficient amount of ethyl ether to enable the collection of the bases by filtration. On concentration of the ether filtrate a second crop of bases is obtained. The combined crude bases are taken up in warm ethanol and a ten percent excess over the amount of 12 N HCl necessary to convert the bases to the dihydrochlorides is added.

The dihydrochloride of febrifugine crystallizes out and is collected and recrystallized by taking up in a minimum amount of hot 50 percent ethanol and then adding absolute ethanol to bring the concentration to 90 percent ethanol. The salt of isofebrifugine is contained in the above-mentioned filtrates which are evaporated almost to dryness, water added, the solution made basic with sodium carbonate, and extracted with chloroform. The chloroform is dried over sodium sulphate, evaporated to dryness and the crude isofebrifugine recrystallized rapidly over hot methanol.

The dihydrochloride of febrifugine is taken up in the minimum amount of water and the equivalent amount of 2.5 N NaOH is added and the solution allowed to stand in the cold, whereupon febrifugine of melting point 150° C. to 153° C. cystallizes out, and it is possible, sometimes, to recrystallize by concentrating a cold solution by evaporation. In general, however, if febrifugine is recrystallized from hot ethanol, and especially if properly seeded, another crystal form of melting point 139° C. to 140° C. is obtained.

Isofebrifugine, when heated at its melting point for a short time, or when refluxed in ethanol from one to two hours, is converted partially to febrifugine. Likewise, febrifugine, when refluxed in chloroform, is converted partially to isofebrifugine. Both conversions are accompanied, to some extent, by side reactions, resulting in some loss of desired material.

The extraction and isolation procedure has been applied to ground root material and the ground leaf material of *Dichroa febrifuga*. The crude alkaloidal content of the air-dried root material was found to vary between 0.05 percent and 0.10 percent. The leaf material appears to contain somewhat less than the amount. In general, it has been found that the mixture of crude bases obtained from root material contains a far larger proportion of febrifugine than isofebrifugine. The proportion varies, however, with different samples of material, and because of the fact that the two alkaloids are interconvertible, it may well be that isofebrifugine does not exist in the intact plant but is an artifact formed in varying amounts during the process of extraction and isolation.

As obtained by the foregoing process, the alkaloid febrifugine forms colorless needles, melting point 139° to 140° C., from ethanol, or colorless needles, melting point 152° to 154° C. from chloroform. The alkaloid exists in at least two crystal forms, the form obtained depends on the solvent used and the presence of seed crystals.

The base is approximately 1 to 3 percent soluble in cold water, ethanol, acetone and chloroform; very soluble in methanol-chloroform mixtures; insoluble in cold ether, benzene, and petroleum ether.

Febrifugine dihydrochloride forms colorless crystals, melting point 220° to 222° C. with previous darkening above 205° C. from 90 percent alcohol.

Isofebrifugine forms colorless, chunky prisms, having a melting point of 129° to 130° C., from methanol.

The base is approximately 0.5 percent soluble in cold water, three to four percent in methanol, and seven percent in chloroform; very soluble in methanol-chloroform mixtures; insoluble in ether, acetone, benzene, and petroleum ether in the cold.

Solubility data for the alkaloid in hot solvents is unreliable because of changes which occur.

Toxicity studies on febrifugine (SN 15,381-4) have included acute experiments in white mice and subacute experiments in the rhesus monkey. The results of these experiments are summarized below.

1. *Acute experiments.*—Preliminary experiments were carried out to give a rough assessment of the acute oral toxicity of febrifugine. This preliminary work showed that the LD 50 for febrifugine would fall between 1 and 10 mg. base per kg. body weight. On the basis of this result, groups of 40 mice received single oral doses of 1, 2 and 5 and 8 mg. base per kg. body weight, with the results shown in the following table:

| Dose, Mg. Base per Kg. Body Weight | No. of Deaths per Total No. Mice | Per Cent Deaths | Remarks |
| --- | --- | --- | --- |
| 1 | 0/40 | 0 | No symptoms. |
| 2 | 14/40 | 35 | Urinary incontinence, sweating, slowing of respiration and loss of appetite were common symptoms. Deaths occurred 10 hours to 3 days after ingestion of drug. Ulceration of mucosa in pyloric area of stomach was a common finding at necropsy. |
| 5 | 38/40 | 95 | |
| 8 | 40/40 | 100 | |

The data presented indicate that the LD 50 of febrifugine for the white mouse is in the neighborhood of 2.5 to 3.0 mg. per kg. Under similar conditions the LD 50 for quinine is in the neighborhood of 350 mg. It is apparent, therefore, that the acute oral toxicity of febrifugine is somewhat more than 100 times that of quinine. The toxic symptoms produced by the two alkaloids are quite different. Quinine is lethal in a matter of minutes or not at all, the principal toxic symptoms being respiratory paralysis. Febrifugine is slower in its action, giving rise to symptoms some 2 to 4 hours after it has been in the body. These symptoms include some effects on respiration, urinary incontinence, sweating, and a corrosive effect on the gastric mucosa. Whether this latter effect is local or central in origin has not been determined.

2. *Subacute experiments*—Three rhesus monkeys were employed in this study. The daily doses for these animals were 0.3, 0.6 and 0.75 mg. base per kg. body weight, one third of these daily doses being administered every 8 hours.

The animal receiving 0.3 mg. doses survived 16 days of treatment with no untoward reactions of any type. At the beginning of treatment, this animal weighed 3.5 kg., at the end 3.7 kg. Since it was not sacrificed, nothing can be said concerning specific organ pathology in this case.

The monkey receiving 0.6 mg. per kg. daily also survived 16 days of treatment in spite of a steady downhill course. This animal became extremely irritable and had a poor appetite from the second day to the end of treatment. The initial weight was 3.0 kg., final weight 2.5, a significant loss in a 16 day period. The monkey was sacrified on the 17th day. Necropsy revealed a moderately fatty liver, possibly due entirely to semi-starvation, marked hyperemia of the gastric mucosa but not frank ulceration. Other organs were normal both to gross and microscopic examination.

The monkey receiving daily doses of 0.75 mg. per kg. succumbed on the 9th day of treatment. This animal exhibited extreme hyper-irritability and almost complete loss of appetite, decreasing in weight from 2.7 kg. at the start of treatment to 2.1 kg. at death. Aside from this, there were no other specific manifestations of toxicity. The autopsy findings in this animal were essentially the same as those described for the monkey on 0.6 mg. doses.

Febrifugine did not affect the formed elements of peripheral blood or bone marrow. It did not produce methemoglobinemia or cyanosis.

The subacute toxicity of febrifugine appears to be qualitatively unlike that of quinine. Quantitatively, febrifugine is more than 300 times as toxic as quinine.

The data of the foregoing toxicity studies deal only with the toxicity of febrifugine and the data were obtained in accordance with such toxicity studies that were carried out for the purpose of indicating a safe dose of the alkaloid for human use, these studies not dealing with antimalarial activity of the compound of this invention in any sense. However, febrifugine has been assessed for its antimalarial activity against trophozoite-induced infections with plasmodium cynomolgi (host, rhesus monkey). Against this infection, the activity of febrifugine is approximately 50 times that of quinine.

The foregoing, specifically described, process represents the preferred procedure for isolating the alkaloids of the present invention. However, variations in operational details, specific solvents, and the like will readily suggest themselves and become apparent to one skilled in the art from a consideration of the foregoing description. It accordingly will be understood that it is intended and desired to embrace, within the scope of the invention, such modifications and changes as may be necessary to adapt it to varying conditions and uses, as defined by the appended claims.

What is claimed is:

1. The process of obtaining febrifugine alkaloids from the plant *Dichroa febrifuga*, which comprises, in the following sequence, the steps of extracting dried plant material with hydrochloric acid, adding to the resulting extract a quantity of adsorbent diatomaceous earth as adsorbent for the alkaloids, contacting the extract and adsorbent until the alkaloids are adsorbed on the adsorbent, dissolving the adsorbed alkaloids in butanol under alkaline conditions, concentrating the alkaloids between immiscible solvents consisting of ligroin and substantially 6 N hydrochloric acid, neutralizing the hydrochloric acid, extracting the resulting neutralized solution with a butanol-chloroform extracting medium, extracting the resulting butanol-chloroform layer with approximately N/4 hydrochloric acid, thereby transferring the alkaloids to the resulting acid extract, alkalinizing the acid extract, extracting the resulting solution with a butanol-chloroform extracting medium, and evaporating the resulting butanol-chloroform phase to dryness at reduced pressure and at room temperature, adding ethyl ether to enable collection of resulting crude alkaloid bases, taking up the resulting crude bases in ethanol, adding hydrochloric acid, and crystallizing the alkaloid bases as dihydrochlorides of the alkaloids.

2. The process of obtaining febrifugine alkaloids from the plant *Dichroa febrifuga*, which comprises, in the following sequence, the steps of extracting dried plant material with substantially tenth-normal hydrochloric acid until extraction of the alkaloids is complete, clarifying the extract, adding adsorbent diatomaceous earth in amount sufficient to adsorb thereon the amount of alkaloids extracted, agitating the extract and adsorbent diatomaceous earth until adsorption of the alkaloids thereon is completed, filtering the resulting liquid through a bed of adsorbent diatomaceous earth, mixing the resulting filter cake with water to make a thin paste, alkalinizing the resulting liquid with sodium carbonate to an amount greater than pH 8.5, adding butanol to the resulting liquid, agitating the butanol and liquid until the alkaloids are dissolved from the adsorbent earth thereby transferring the alkaloids from the adsorbent earth to the butanol, extracting the resulting butanol solution with ligroin acidified with 6 N hydrochloric acid, allowing the resulting mixture to separate into layers, withdrawing the resulting aqueous layer, extracting the resulting organic layer with substantially tenth-normal hydrochloric acid, thereby transferring the alkaloids to the resulting hydrochloric acid extract, neutralizing the acid with sodium carbonate until the solution becomes about $1/20$ molar with respect to sodium carbonate, extracting the alkaloids from the resulting solution with a butanol-chloroform extraction mixture, repeating extraction of the alkaloids from the said mixture with substantially fourth-normal hydrochloric acid, alkalinizing the resulting acid extract containing the alkaloids, extracting the alkaloids from the acid with a butanol-alcohol extracting medium, evaporating the resulting medium under reduced pressure and atmospheric temperature to a paste consistency, adding ethyl ether to the resulting crude alkaloids, collecting the alkaloids, dissolving the crude alkaloids in ethanol, adding twelve-normal hydrochloric acid to the resulting solution, crystallizing febrifugine dihydrochloride from the said solution, separating the said dihydrochloride crystals from the resulting liquid by filtration, and separating isofebrifugine dihydrochloride from the resulting filtrate.

3. The process of obtaining febrifugine alkaloids from the plant *Dichroa febrifuga*, which comprises, in the following sequence, the steps of extracting dried plant material with hydrochloric acid, adding to the resulting extract a quantity of adsorbent diatomaceous earth as adsorbent for the alkaloids, contacting the extract and adsorbent until the alkaloids are adsorbed on the adsorbent, dissolving the adsorbed alkaloids in butanol under alkaline conditions, concentrating the alkaloids between immiscible solvents consisting of ligroin and substantially 6N hydrochloric acid, neutralizing the hydrochloric acid, extracting the resulting butanol-chloroform layer with approximately N/4 hydrochloric acid thereby transferring the alkaloids to the resulting acid extract, alkalinizing the acid extract, extracting the resulting solution with a butanol-chloroform extracting medium, and evaporating the resulting butanol-chloroform phase to dryness at reduced pressure and at room temperature.

JOSEPH B. KOEPFLI.
JAMES F. MEAD.
JOHN A. BROCKMAN, Jr.

REFERENCES CITED

The following references are of record in the file of this patent:

UNITED STATES PATENTS

| Number | Name | Date |
|---|---|---|
| 1,048,712 | Lloyd | Dec. 31, 1912 |
| 1,300,747 | Lloyd | Apr. 15, 1919 |
| 2,192,460 | Thompson | Mar. 5, 1940 |
| 2,248,241 | Kondo et al. | July 8, 1941 |

OTHER REFERENCES

Jang et al.: Science, vol. 103, page 59 (1946).